United States Patent [19]
Wareman et al.

[11] Patent Number: 4,780,618
[45] Date of Patent: Oct. 25, 1988

[54] TRACTOR-TRAILER POWER CONVERSION CIRCUIT

[76] Inventors: Frederick C. Wareman, 7701 S. Montana Dr.; Robert N. Binns, Sr., 7700 S. Texas Dr., both of Raleigh, N.C. 27604

[21] Appl. No.: 161,722

[22] Filed: Feb. 29, 1988

[51] Int. Cl.⁴ ............................................. F25B 21/02
[52] U.S. Cl. ..................................... 307/9; 307/10 R; 307/64; 307/150; 62/236; 62/323.1; 62/239; 123/142.5 R; 219/202
[58] Field of Search ...................... 307/9, 10 R, 10 BP, 307/10 LS, 41, 64, 65, 66, 150; 123/142.5 R, 142.5 E, 41.46, 179 E; 62/64, 78, 91, 163, 228.5, 236, 239, 229, 278, 323.1, 373; 340/81 R, 90, 74; 219/202, 208, 279, 364; 165/42, 43, 41

[56] References Cited

U.S. PATENT DOCUMENTS

| | | | |
|---|---|---|---|
| 3,475,919 | 11/1969 | Ellis | 62/236 X |
| 4,271,677 | 6/1981 | Harr | 62/323.1 X |
| 4,280,330 | 7/1981 | Harris et al. | 62/236 X |
| 4,448,157 | 5/1984 | Eckstein et al. | 123/142.5 R |
| 4,672,296 | 6/1987 | Griffin | 62/323.1 X |
| 4,720,980 | 1/1988 | Howland | 62/236 X |

*Primary Examiner*—William M. Shoop, Jr.
*Assistant Examiner*—Paul Ip
*Attorney, Agent, or Firm*—Rhodes, Coats & Bennett

[57] ABSTRACT

The present invention entails a power switching system for a tractor-trailer that can be selectively actuated to direct power to the tractor unit from an auxiliary power source such as a refrigeration unit mounted on the trailer. When the tractor-trailer is in a parked position, power can be furnished to the tractor and to energy consuming components thereof through an auxiliary power source carried by the tractor-trailer, thereby improving the total fuel economy of the rig. In the power switching system of the present invention, there is provided a switch assembly for operatively connecting run, accessory, start/ignition circuits to the auxiliary power source. In addition, an oil and water heater circuit can be powered through the same auxiliary power source. Finally, a trickle charge may even be directed from the auxiliary power source to the battery of the tractor engine.

10 Claims, 2 Drawing Sheets

TRACTOR-TRAILER POWER CONVERSION CIRCUIT

FIELD OF THE INVENTION

The present invention relates to tractor-trailers and more particularly to auxiliary power systems for tractor-trailers that enable certain energy consuming components of the tractor to be driven by the auxiliary power source.

BACKGROUND OF THE INVENTION

It is appreciated that tractor-trailers are one of the most efficient and effective cross-country transporting means available today. Tractor drivers log hundreds of thousands of miles over relatively short time periods transporting everything from produce to transformers from coast to coast.

Because of certain regulations and the requirement that a driver sleep and rest, it is common practice for truckers to park their rigs for extended sleep and rest time periods. During these parking periods, it is customary for the trucker to leave the tractor engine "on". This is for various reasons. First, especially at night, the tractor and trailer lights should be maintained "on" for safety purposes. In addition, in cold climates it is necessary for the engine to remain running because in cold climates it can be very difficult to start a tractor engine. In addition, the engine is left running to avoid a power drain of the battery because the tractor operator may be running various accessories in the cab.

The net affect of all of this is that a substantial amount of fuel is required during this "parked" mode. The continuous running of the tractor is a very inefficient means of providing the necessary power for parking lights and other power consuming elements associated with the tractor.

The inefficiency of the above is further compounded in tractor-trailer rigs having a refrigerated trailer. This is because the refrigerated trailer has a refrigeration unit that is powered by an engine that must continuously provide power to drive the refrigeration unit. Thus, in the case of a tractor-trailer with a refrigerated trailer, when the rig is in the "parked" mode, one typically finds the tractor engine and the refrigeration unit's engine both continuously running. That involves a substantial waste of energy and fuel in terms of the load being carried.

SUMMARY AND OBJECTS OF THE INVENTION

The present invention entails a power transfer or switching system designed to overcome the inefficient use of fuel by the trucking industry.

First, the present invention entails a power switching system for switching between the tractor's main engine and the engine or power supply of an auxiliary power unit. This switching system enables various circuits such as a run circuit and an accessory circuit to be powered from the auxiliary power source. In addition, other energy consuming elements or components associated with the tractor can be selectively powered by the auxiliary power supply.

Secondly, the present invention entails a power switching system particularly designed for a refrigerated tractor-trailer. In this disclosure, there is provided a switching system for switching between the tractor's engine and the power source or engine associated with a refrigeration unit mounted on the trailer. Consequently, this enables the run circuit and accessory circuit of the tractor cab to be powered through the engine associated with the refrigeration unit.

It is therefore an object of the present invention to provide a power switching system for a tractor-trailer that enables certain energy consuming components of the tractor-trailer to be powered either through the main tractor engine or an auxiliary on-board power source.

It is also an object of the present invention to substantially improve the overall fuel economy of a tractor-trailer by providing a more efficient power supply for supplying power to the tractor-trailer's parking lights, and other accessories and energy consuming components when the tractor-trailer assumes an operational/park mode.

It is also an object of the present invention to provide a power switching system for a refrigerated tractor-trailer that will enable the operator to selectively utilize the refrigeration unit to provide power to the tractor cab and its various energy consuming components when the tractor-trailer is in an operational/park mode.

Still a further object of the present invention resides in the provision of a power switching system of the character referred to above that is relatively simple, easy to use, and which incorporates safeguards, especially in the start/ignition circuit.

A further object of the present invention is to provide a power switching circuit of the character referred to above that provides multi-functions inasmuch as the same is designed to direct power from the auxiliary power source to various tractor circuits and which is further designed to selectively provide a trickle charge from the auxiliary power source to the battery of the tractor engine.

It is therefore an object of the present invention to provide a switching system for an auxiliary tractor-trailer power source that will permit the annual savings of in excess of a billion gallons of fuel per million tractor-trailer units.

Other objects and advantages of the present invention will become apparent and obvious from a study of the following description and the accompanying drawings which are merely illustrative of such invention.

DETAILED DESCRIPTION OF THE INVENTION

With further reference to the drawings, the tractor-trailer power switching circuit is shown therein and indicated generally by the numeral 10.

Figure 2:
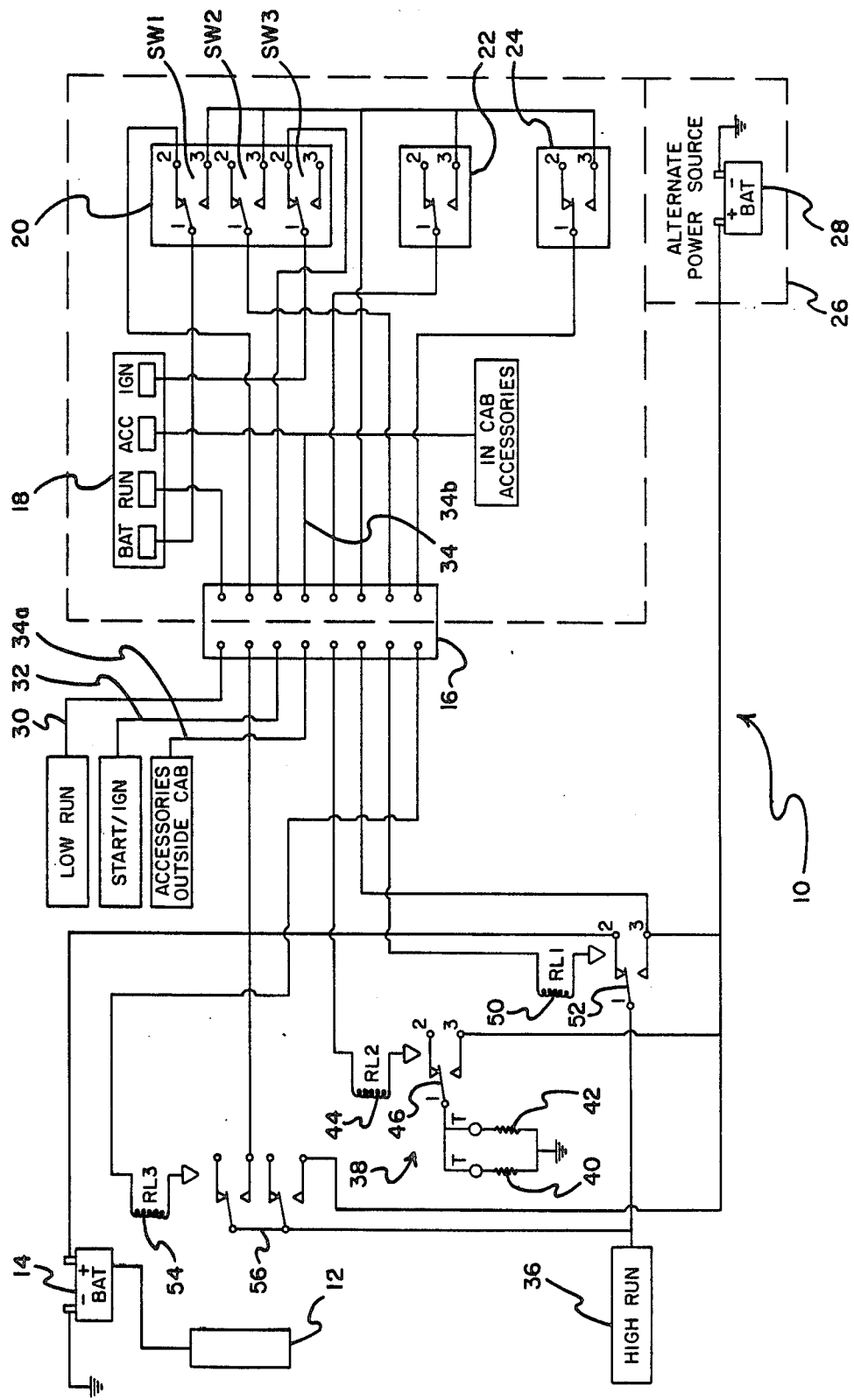
FIG. 2 is an electrical schematic of the power switching system of the present invention.

First, basically reviewing the circuit components as shown in FIG. 2, it is seen that a tractor engine indicated by reference numeral 12, is operative to charge tractor battery 14. Forming a part of the switching circuit 10 is a fuse box 16 that interconnects various components of the switching circuit 10. As seen in the drawings, fuse box 16 is operatively connected to a tractor ignition main panel key switch 18. Tractor ignition switch 18 includes a battery terminal for receiving power. In addition, ignition switch 18 includes a run position, an accessory position, and a start/ignition position.

The tractor-trailer power switching circuit 10 further includes a gang switch assembly 20 that includes three separate switches, SW1, SW2, and SW3. In addition, the tractor-trailer power switching circuit 10 includes two additional switches 22 and 24.

Figure 1:
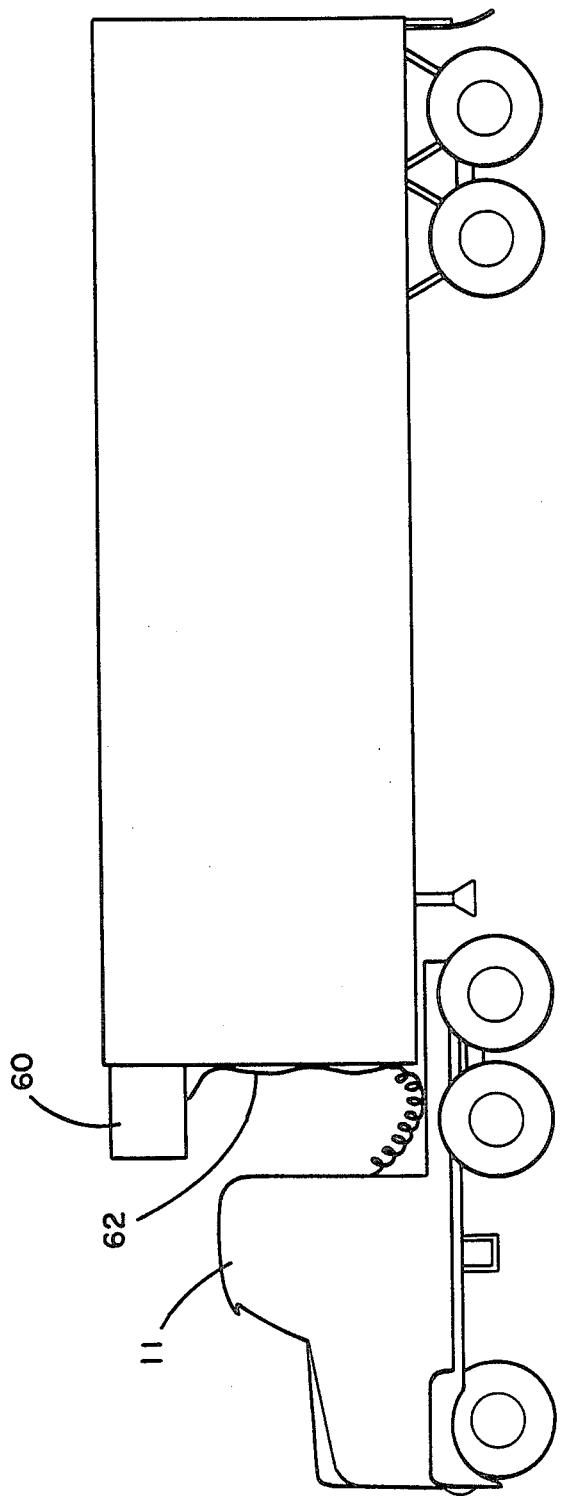
FIG. 1 is a view of a refrigerated tractor-trailer that incorporates the power switching system of the present invention.

Operatively connected to the power switching circuit 10 is an alternate power source indicated by numeral 26. In one embodiment of the present invention the alternate power source is that power source used to power a refrigeration unit 60 on the trailer (FIG. 1). It should also be appreciated that the alternate power source in another embodiment of the present invention would entail a conventional DC generator. In any event, the alternate power source 26 is operative to maintain a charge on auxiliary battery 28.

In order to transfer power to various parts of a tractor unit 11, there are a series of power transfer circuits. These are referred to as a low run circuit 30, a start/ignition circuit 32, and an accessory circuit 34. It is noted that accessory circuit 34 includes two branches, branch 34a for accessories outside of the cab of the tractor and branch 34b for accessories inside of the cab. In addition, there is a high run circuit 36 that is specifically designed to supply power to energy consuming components that require a relatively large amount of power or energy, for example, the glow plugs of the tractor 11.

In addition, tractor 11 is provided with an oil and water heater circuit, indicated generally by the numeral 38, for heating the oil and water contained in the tractor engine. Viewing oil and water heater circuit 38 in more detail it is seen that the same includes an oil heater 40 and a water heater 42. Connected within the heater circuit 38 is a heater relay 44 that is operative to actuate accompanying switch 46.

The power switching circuit 10 further includes a high run circuit relay 50 which is adapted to actuate an accompanying switch 52.

Finally, power switching circuit 10 includes a trickle charge relay 54 that is operative to actuate an accompanying double throw switch 56.

Now, turning to the operation of the power switching circuit of the present invention, first reference will be made to a normal run mode. In this mode, gang switch 20 is in what will be referred to as the "off" position (FIG. 2). In this "off" position, the pins of the respective three switches of gang switch 20 will extend between pin points 1 and 2 of each switch. In this mode, it is seen that current from tractor battery 14 is supplied to the ignition switch 18 via SW1 of gang switch 20. It is thus appreciated that run circuit 30, start/ignition circuit 32, and accessory circuit 34 can be powered by the tractor battery 14. Note that SW3 of gang switch 20 enables the tractor engine to be started via the ignition/start circuit 32.

It is also appreciated that high run circuit 36 is also powered through tractor battery 14. In this mode, the trickle charge circuit and the oil and water heater circuit are inoperative.

Now assume that the tractor operator pulls his or her rig off the road and parks the same in a truck stop and the plan is for the tractor-trailer to be stationed there for a substantial amount of time. To conserve fuel gang switch 20 is switched from the "off" position to the "on" position. This will be referred to as the park/operational position. By switching SW1 to where pins 1 and 3 connect, the battery terminal of ignition switch 18 is operatively connected to battery 28 of the auxiliary power source 26. This means that the low run circuit 30 and the accessory circuit 34 is powered by the auxiliary battery 28. Note that in the "on" position, SW2 of gang switch 20 is operative to actuate high run circuit relay 50 which actuates and closes accompanying switch 52 to where the switch extends between pins 1 and 3. That connects high run circuit 36 which powers such high energy consuming items as glow plugs, to the auxiliary battery 28. In this park/operational mode the switching circuit 10 is designed such that the tractor's start ignition circuit may not be actuated. Note SW3 which is operatively connected to the start/ignition terminal of switch 18. In the "on" position SW3 is such that the switch extends between pins 1 and 3 and consequently there is no power available to start the tractor engine when gang switch 20 is in the "on" position.

In the "on" position, gang switch 20 permits the engine to continue to run in cases where the gang switch 20 is switched from the "off" to "on" position while the tractor engine is alive. By simply turning ignition switch 18 from the run position to the accessory position will effectively kill the engine.

In the park/operational mode when the gang switch 20 is in the "on" position, it follows that the various accessories including safety lights, radio, and any other powered accessory, would be powered via the auxiliary battery 28 through the alternate power source 26. Again, it is appreciated that because of the position of switch SW3 that the engine cannot be started until the gang switch 20 is switched back to the "off" position.

In certain cold environments, it will be desirable to maintain the tractor engine warm while the tractor 11 is in the park/operational mode. To accomplish this, switch 22 is actuated to the "on" position where the switch extends between pins 1 and 3. In this position switch 22 is operative to direct power from the auxiliary battery 28 to the heater relay 44 which in turn actuates accompanying switch 46 which is operative to turn oil heater 40 and water heater 42 "on".

There are occasions when the tractor battery 14 may be weak and it is desirable to provide a continuous trickle charge to the tractor battery 14. To accomplish this switch 24 is switched from its normal "off" position to an "on" position where the switch connects pins 1 and 3. Thus switch 24, is operative to direct power from the auxiliary battery 28 to trickle charge relay 54 which in turn actuates an accompanying double throw switch 56. Switch 56, when in this "on" or actuated position, is operative to direct power from auxiliary battery 28 to the tractor battery 14. At the same time, tractor battery 14 is operative to supply power to the various power consuming circuits.

As noted before, the present switching circuit 10 is particularly designed to operate in conjunction with a refrigerated tractor-trailer such as the type shown in FIG. 1. In this case, the tractor-trailer includes the refrigeration unit 60 that is typically mounted adjacent the exterior wall structure of the trailer. Refrigeration unit 60 would include an engine and an associated battery that would correspond to 26 and 28 respectively in FIG. 2. Note in FIG. 1 the interconnection of wires between refrigeration unit 60 and tractor 11.

Since the refrigeration unit must continually heat or cool the trailer portion of the tractor-trailer, it follows that the refrigeration unit provides a very practical and very economical auxilliary power source for the tractor-trailer. Accordingly, the refrigeration unit 60 can be utilized by the tractor-trailer unit in the operational/park mode to power the various circuits shown in FIG. 2 and described above.

From the foregoing specification and discussion, it is appreciated that the power switching system of the present invention is a very practical but relatively simple design that is very efficient and effective in supplying energy to certain energy consuming components when the tractor's engine 12 is not running.

The present invention may, of course, be carried out in other specific ways than those herein set forth without parting from the spirit and essential characteristics of the invention. The present embodiments are, therefore, to be considered in all respects as illustrative and not restrictive, and all changes coming within the meaning and equivalency range of the appended claims are intended to be embraced therein.

What is claimed is:

1. A power transfer system for a tractor-trailer that enables an operator to selectively derive power from a main engine battery or an auxiliary engine battery comprising in combination: a main switch panel having run, accessory, and start/ignition positions, and further including a battery input terminal; a series of operating circuits leading from the main switch panel and including a low run circuit, and an accessory circuit, and a start/ignition circuit; a gang switch assembly having a series of switches operatively interconnected such that the actuation of one switch results in the actuation of all the gang switches and including a first switch operatively interconnecting the main switch panel with both the main engine battery and the auxiliary engine battery, the first switch of the gang switch assembly being operative to direct power from either battery to the battery input terminal and operative to control the run and accessory circuits; the gang switch assembly further including a second start/ignition control switch operatively connected in the start ignition circuit; the gang switch assembly being movable from an "off" position to an "on" position and wherein in the "off" position the first switch is operative to connect the main switch panel with the main engine battery and in the "on" position the first switch is operative to connect the main switch panel with the auxiliary engine battery; and wherein the second start/ignition switch is operative in the "on" position to prevent the tractor engine from starting through the start/ignition circuit; the power transfer system further including an engine oil and water heater circuit having a control switch that connects the same to the auxiliary engine battery; and wherein the power transfer system further comprises a trickle charge circuit for providing a trickle charge from the auxiliary engine battery to the main engine battery and includes a control switch disposed in the trickle charge circuit and operatively connected to the main engine battery and the auxiliary engine battery for selectively providing a trickle charge current from the auxiliary engine battery to the main engine battery.

2. The power transfer system for the tractor-trailer of claim 1 further including a high run circuit for directing power to relatively high energy consuming components such as glow plugs, and wherein there is provided within the gang switch assembly a third control switch for selectively directing power from the auxiliary engine battery to the high run circuit.

3. The power transfer system for the tractor-trailer of claim 2 wherein the high run circuit is normally connected to the main engine battery through a solenoid actuated switch.

4. In a tractor-trailer having a tractor, a tractor engine and associated battery, a main key switch panel, a refrigerated trailer with a powered refrigeration unit mounted thereon and including a refrigeration engine and associated battery; the improvement comprising a switching system for selecting powering certain tractor components from the powered refrigeration unit including: means for selectively directing power from the refrigeration unit to the main key switch panel for enabling certain tractor power consuming elements such as lights, cigarette lighter outlet, etc., to be powered by the refrigeration unit; the means for selectively directing power from the refrigeration unit including switch means operatively interconnected between the battery of the tractor engine and the battery of the refrigeration unit for selectively directing power from the refrigeration unit to the power consuming elements of the tractor; and ignition control means for preventing the tractor from being started when the refrigeration unit is directing power to the power consuming elements of the tractor.

5. The improved tractor-trailer powered switching system of claim 4 including an oil and water heater circuit and a control switch operatively connected therein and further operatively connected to the refrigeration unit and wherein the control switch within the oil and water heater circuit can be actuated to direct power from the refrigeration unit to the oil and water heater circuit.

6. The improved tractor-trailer power switching system of claim 5 including a trickle charge circuit and switch means interconnected therein and operatively connected to the refrigeration unit for selectively directing a trickle charge from the refrigeration unit to the battery of the tractor engine.

7. A method of supplying power from an auxiliary power source to the tractor portion of a tractor-trailer rig comprising: operatively interconnecting switch means between an auxiliary power source and the battery of the tractor engine; selectively actuating the switch means and directing power from the auxiliary power source to the tractor and certain energy consuming components thereof; preventing the tractor from being started when power is being directed to the tractor from the auxiliary power source; and providing an oil and water heater circuit and connecting a control switch therein that is operatively connected to the auxiliary power source and providing power from the auxiliary power source to the oil and water heater circuit for powering the same.

8. The method of claim 7 further including the step of directing a trickle charge from the auxiliary power source to the battery of the tractor engine.

9. The method of claim 7 further including the step of coupling a series of switches together to form a gang switch assembly and controlling run, start, and ignition circuits through the gang switch assembly.

10. The method of claim 9 further including both high and low run circuits and actuating the high run circuit through a solenoid actuated switch and controlling the solenoid actuated switch through a high run control switch.

* * * * *